Jan. 29, 1924.

L. F. DUFF ET AL 1,482,071

DISPENSING STAND

Filed March 6, 1922   2 Sheets-Sheet 1

LEE F. DUFF
GEORGE LANGHANS
INVENTORS.

BY R. W. Smith
ATTORNEY.

Jan. 29, 1924.
L. F. DUFF ET AL
1,482,071
DISPENSING STAND
Filed March 6, 1922
2 Sheets-Sheet 2
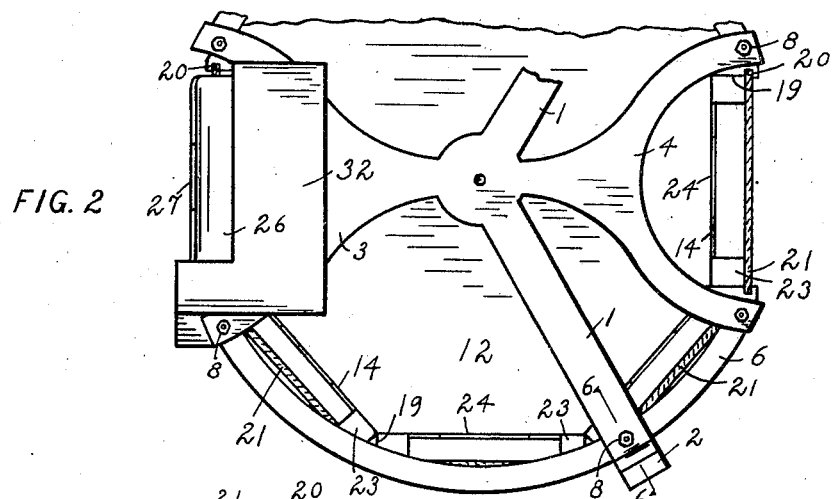
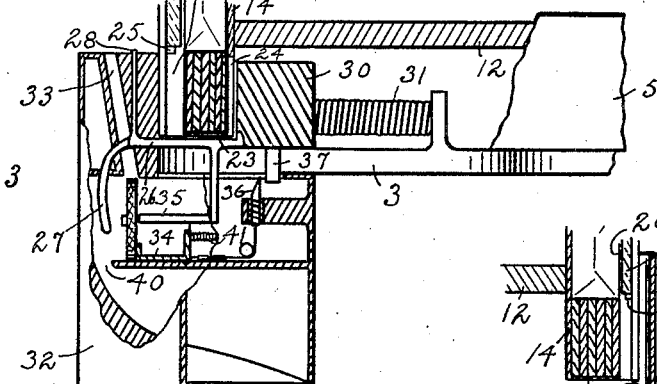
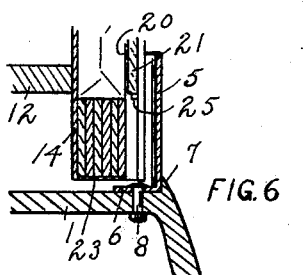
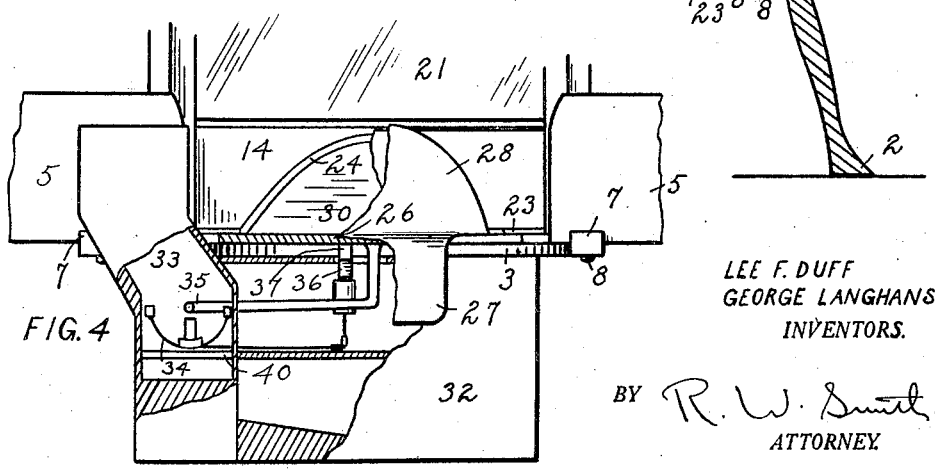
LEE F. DUFF
GEORGE LANGHANS
INVENTORS.
BY R. W. Smith
ATTORNEY.

Patented Jan. 29, 1924.

1,482,071

UNITED STATES PATENT OFFICE.

LEE F. DUFF AND GEORGE LANGHANS, OF LOS ANGELES, CALIFORNIA.

DISPENSING STAND.

Application filed March 6, 1922. Serial No. 541,342.

*To all whom it may concern:*

Be it known that we, LEE F. DUFF and GEORGE LANGHANS, citizens of the United States, residing at Los Angeles, county of Los Angeles, State of California, have invented new and useful Improvements in Dispensing Stands, of which the following is a specification.

It is the object of this invention to provide a dispensing stand for chewing gum and the like, which is adapted to hold a number of different kinds of gum, so that the desired kind may be conveniently obtained.

It is a further object of the invention to provide a stand of this character, wherein means are provided for manually withdrawing the desired kind of gum, said manual withdrawing means being conveniently located with relation to the storekeeper; and to combine in the machine, when so desired, a check controlled withdrawing means located adjacent the purchaser. By this arrangement, a dispensing device is formed, which may be used as an automatic machine; or which may be operated by the storekeeper when it is more convenient to purchase by this manner, as for example, when it is necessary to make change.

The invention will be readily understood from the following description of the accompanying drawings, illustrating one of several practical embodiments of the device.

Fig. 2 is a partial bottom plan view of the device.

Fig. 3 is a side elevation, partly in section, of the check controlled withdrawing means.

Fig. 4 is a front elevation of the same, partly in section.

Fig. 6 is a detail section on the line 6—6 of Fig. 2.

Figure 1:
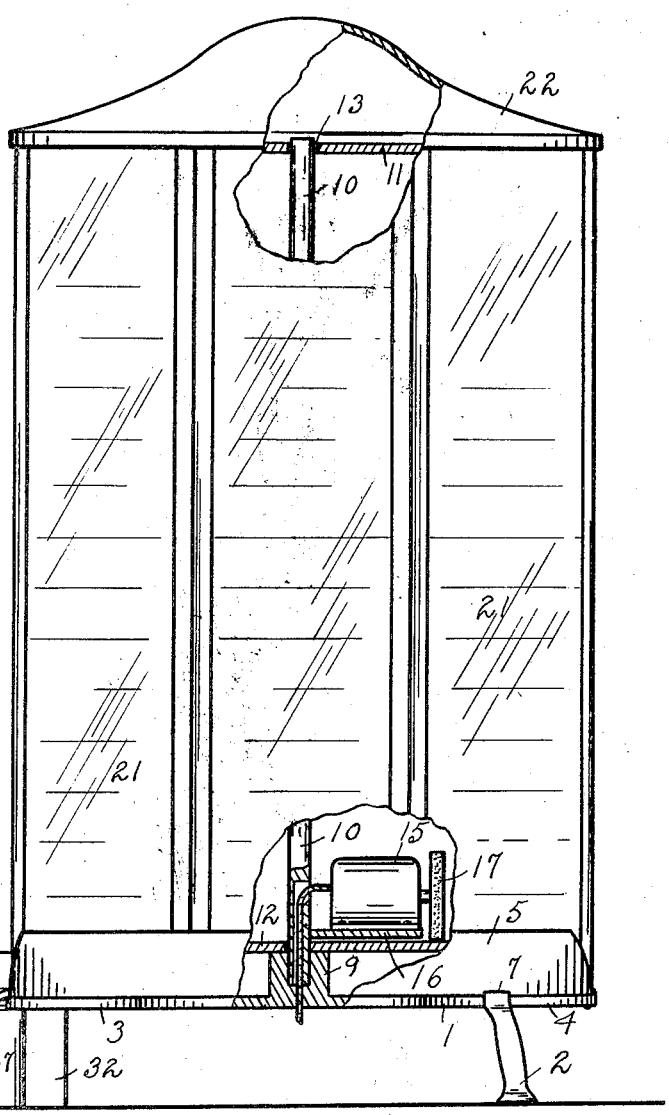
Fig. 1 is a side elevation of the dispensing stand, patly broken away.
Figure 5:
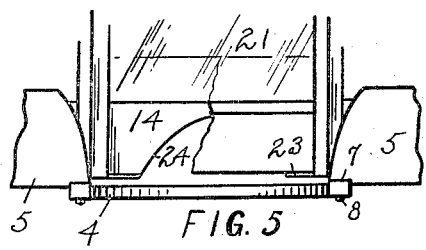
Fig. 5 is a front elevation, partly broken away, of the manual withdrawing means at the opposite side of the machine.

The dispensing stand comprises a base having a rotatable drum carrying the gum containers mounted thereon, said base, in the present instance, having means at the side which is toward the storekeeper, for freely manually withdrawing gum from any one of the gum containers turned opposite the same, and at the opposite side which is toward the purchaser, having a check controlled withdrawing means, which is also adapted to function in connection with any one of the gum containers upon the rotatable drum.

The base is shown as a spider having arms 1, terminating in feet 2, and also including the opposite forked supporting arms 3 and 4. An upstanding circumferential flange 5 is mounted upon the spider, and has an inturned lip 6 at its bottom which rests upon arms 1, 3, and 4, the latter having lips 7 engaging the flange, while said flange is fixed to said arms by bolts 8 extending through lip 6 and the arms. Between the branches of forked arm 3, the flange 5 is cut away to provide an opening for the check controlled withdrawing means, and in similar manner, said flange is cut away between the branches of forked arm 4, to provide for the free manual withdrawing means.

A boss 9 extends upwardly from the center of the spider forming the base, and a rod 10 projects upwardly from this boss, and is adapted to receive the rotatable drum carrying the gum containers.

This drum is shown as a hollow structure including end plates 11 and 12 provided with bearing openings 13 adapted to receive the rod 10, and a plurality of vertically extending plates 14 fixed to end plates 11—12, and forming the periphery of the drum. These vertical plates each form the back of a container groove, so that said grooves are spaced around the circumference of the drum, and with a different kind of gum in each groove, the desired kind may be obtained by stopping the rotatable drum with the proper groove opposite either the free manual withdrawal opening, or the check controlled withdrawal opening in flange 5.

The lower end plate 12 of the drum rests upon boss 9 to provide for free rotation of the drum, and in practice the drum may be continually rotated at a slow speed by a suitable driving means arranged for stopping of the drum at the desired point. As an instance of this arrangement, an electric motor 15 may be mounted within the drum upon a support 16 carried by rod 10, said motor having a friction drive wheel 17 engaging end plate 12, to provide a frictional driving connection for rotation of the drum. It will be understood that the operator may stop the drum at any point, by simply holding the same against the action of the frictional driving connection.

The respective container grooves are formed by side plates 19 extending outwardly from the sides of back plates 14, and terminating in guideways 20. A glass plate 21 forming a closure for the container groove is received in guideways 20.

The upper ends of the container grooves are open, for filling of said grooves with packages of gum or the like, and a top 22 is adapted to be received over the top of the rotatable drum and the container grooves mounted thereon, so as to close said grooves.

At the lower ends of the container grooves, side plates 19 are inturned to form rests 23 supporting the stack of packages within the groove, and plate 14 forming the back of the groove, is cut away opposite the lowermost package resting upon rests 23, as shown at 24. The glass plate forming the front closure for the container groove terminates short of the lowermost package in the groove, and may be supported upon lips 25 extending inwardly from side plates 19. By this arrangement, a front discharge means is provided opposite the lowermost package in a groove.

The upturned flange 5 prevents access to the discharge means of the container grooves, but the opening in said flange above forked arm 4, allows free access to the discharge opening of the container groove which is opposite said opening. In order to withdraw the lowermost package of the stack within the groove which is opposite said flange opening, it is only necessary to insert the finger beneath said groove, in the space formed between the branches of forked arm 4, and then push against the lowermost package through the opening 24 in the back of the groove. The package is thus readily removed from its groove and from the dispensing device.

At the opening in flange 5 which is above forked arm 3, a withdrawal plate is slidably mounted for removal of the lowermost package of a stack, said withdrawal plate being normally locked against movement, and when in locked position having a front plate overlying the discharge opening of the container groove and closing the opening in flange 5, so that a package cannot be withdrawn until the withdrawal plate is unlocked and slid outwardly. The locking means for the withdrawal plate may be any suitable check controlled apparatus.

Describing in detail the check controlled withdrawal means, the withdrawal plate is shown at 26, slidable upon forked arm 3 beneath any container groove turned opposite the same, and movable outwardly through the opening in flange 5. This plate is turned downwardly at its forward end to provide the finger member 27, and has an upstanding guard plate 28, which, when the withdrawal plate is moved inwardly and in locked position, is received in the opening in flange 5, so as to prevent access to the discharge opening at the lower end of the container groove.

The withdrawal plate also carries a block 30 extending upwardly in rear of the lowermost package in a container groove. The withdrawal plate is normally retracted, as by a spring 31, but when it is unlocked, as will be explained, it may be moved outwardly by grasping finger member 27, and the block 30 will then move through opening 24 in the bottom of the container groove, so as to push the lowermost package from the stack in the groove. The guard 28 having moved outwardly with the withdrawal plate, the opening in flange 5 is thus uncovered, and the withdrawn package may be thus readily removed from the machine.

The check controlled locking means for the withdrawal plate may include a receptacle 32 suspended from forked arm 3 and having a check depositing guideway 33 extending upwardly alongside the opening in flange 5. A slidable support 34 receives a check deposited in the device and holds the same standing upon its edge. A finger 35 depending from plate 26 is in alinement with the check held in this position, so that when the withdrawal plate is moved outward, said finger will impinge against the check and cause its support 34 to move forward. A latch 36 is connected to support 34 so that movement of the latter will retract the latch and thus free a locking stop 37 depending from plate 26 and normally engaged by said latch to lock the withdrawal plate in its retracted position.

It will be understood that if there is no check deposited in the support 34, attempted movement of the finger 35 with the withdrawal plate, will not cause movement of support 34, and as a consequence the latch 36 is not detracted. The withdrawal plate will thus remain locked.

When the check controlled mechanism is operated, the movement of support 34, will finally allow the check held thereby to drop through an opening 40 and into the collection portion of receptacle 32, and support 34 is then retracted by a spring 41. As soon as a package has been removed by the withdrawal plate, the release of the latter will allow spring 31 to return the plate to its retracted position, where it is locked by the spring pressed latch 36.

It will thus be seen that an efficient dispensing stand is provided, which is adapted to dispense a selected one of various kinds of articles, the dispensing means being either a free manual withdrawal means or a check controlled mechanism.

While we have illustrated and described but one practical embodiment of the device, it will be apparent that various changes may be made in the construction, combination, and arrangement of parts without departing from the spirit of the invention.

What is claimed is:

1. A dispensing stand comprising a plurality of containers with discharge means, a closure means for said discharge means having an opening for alinement with a selective one of said discharge means to permit free manual withdrawal therefrom, said closure means having a second opening for alinement with a selective one of said discharge means, and a check controlled withdrawal means cooperating with said second opening.

2. A dispensing stand comprising a plurality of circumferentially arranged container grooves with discharge means at their lower ends, a base for said stand having a flange extending over said discharge means to close the same, said flange having an opening for alinement with a selective one of said discharge means to permit free manual withdrawal therefrom, said flange having a second opening for alinement with a selective one of said discharge means, and a check controlled withdrawal means cooperating with said second opening.

3. A dispensing stand comprising a member having a plurality of circumferentially arranged containers with discharge means, a continuously rotating means, a frictional driving connection between said continuously rotating means and said member, and a closure means for said discharge means having an opening for selective alinement with the respective discharge means.

In testimony whereof we have signed our names to this specification.

LEE F. DUFF.
GEORGE LANGHANS.